United States Patent

[11] 3,545,619

| [72] | Inventors | William F. Ettlich<br>Corvallis;<br>Andrew Kou-Ying Hsiung, Corvallis,<br>Oregon |
|---|---|---|
| [21] | Appl. No. | 814,740 |
| [22] | Filed | April 9, 1969 |
| [45] | Patented | Dec. 8, 1970 |
| [73] | Assignee | Neptune Microfloc, Incorporated<br>Corvallis, Oregon<br>a corporation of Oregon |

[54] WATER TREATMENT PLANT
3 Claims, 4 Drawing Figs.

[52] U.S. Cl. ............................................. 210/196,
 210/80, 210/202, 210/203, 210/265, 210/275
[51] Int. Cl. .............................................. B01d 23/16
[50] Field of Search........................................... 210/42, 80,
 82, 196, 265, 275, 200—203

[56] References Cited
UNITED STATES PATENTS
| 3,393,149 | 7/1968 | Conley et al. .................. | 210/53X |
| 3,472,764 | 10/1969 | Culp et al. ..................... | 210/195X |

OTHER REFERENCES
Hartung, H.O., et al., Treatment Plant Innovations in St. Louis County, MO., Jour. AWWA, Vol. 50, July 1958, P.P. 965— 974 (Copy In Gp. 176)210— 265

*Primary Examiner*—Michael Rogers
*Attorney*—Buckhorn, Blore, Klarquist and Sparkman ABSTRACT: A water treatment plant having a mixing basin, settling basin and filter is arranged so that backwash from filter is returned directly to settling basin for recirculation.

WILLIAM F. ETTLICH
ANDREW KOU-YING HSIUNG
INVENTORS.

BY
BUCKHORN, BLORE, KLARQUIST & SPARKMAN
ATTORNEYS

WILLIAM F. ETTLICH
ANDREW KOU-YING HSIUNG
INVENTORS.

BY
BUCKHORN, BLORE, KLARQUIST & SPARKMAN
ATTORNEYS

WATER TREATMENT PLANT

BACKGROUND OF INVENTION

In the usual water filtration plant, the raw water is treated with chemicals and then subjected to agitation in a so-called flocculator to cause the formation of large precipitable particles which will carry out of the raw water the turbidity producing particles and other foreign materials. Thereafter, the water is passed to a settling basin to permit the heavy settleable materials to drop out of the water, and finally the water is passed through a filter. Periodically it is necessary to backwash the filter. Heretofore the backwash water has generally simply been discarded, but such practice is costly in that the water loss can amount up to 7 percent of the total output of the plant. Moreover, in numerous areas discharge of the waste water is prohibited. Thus, in some instances the backwash water has been treated in a separate water treatment system and then returned to the main treatment plant, but this obviously adds substantial expense to the overall treatment process.

SUMMARY OF INVENTION

It is an object of the present invention to provide a new and improved water treatment process that will minimize the amount of waste water.

Another object of the invention is to provide a water treatment process that will result in economies in treatment chemicals.

Still another object of the invention is to provide a new and improved arrangement of a water treatment plant effecting economies in construction and operational costs.

A treatment plant in accordance with the invention comprises a means for effecting a growth of a floc in the water to be treated, a settling means for removing the settleable floc and other foreign materials from the water, and a filter. In accordance with the process of the invention, the filter is periodically backwashed and the backwash of the filter fed directly to the settling device for recirculation therethrough.

DRAWINGS

DETAILED DESCRIPTION OF INVENTION

Figure 1:
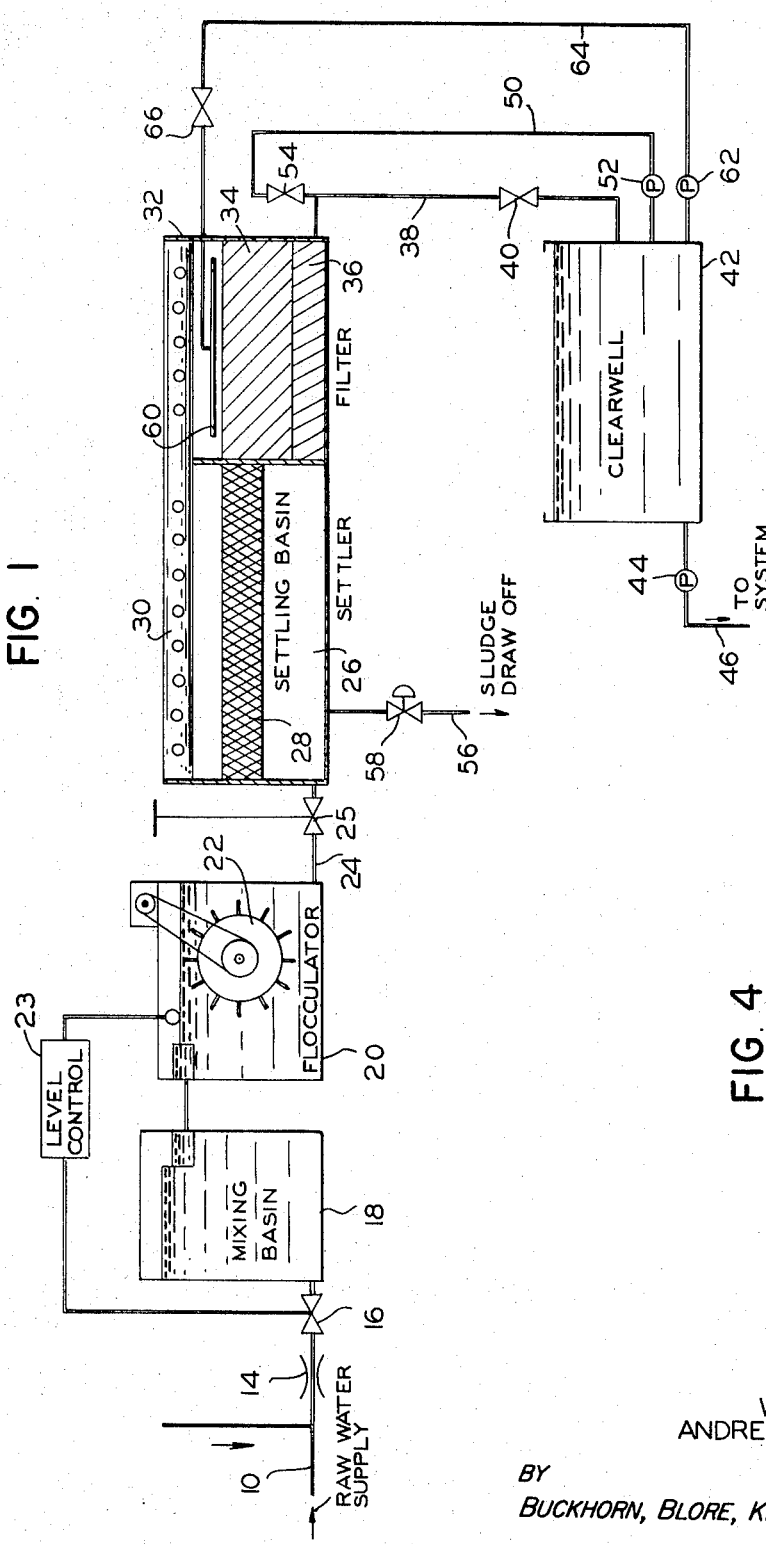
FIG. 1 is a schematic representation of a water treatment plant constructed in accordance with the invention.

Referring first to FIG. 1, a line for carrying the raw water from a suitable supply such as a stream, lake or underground source is indicated in 10. To such water chemicals are added at a suitable point, such as at 12, and the water passed through a metering device 14 and an inlet flow control valve 16 to a mixing basin 18. From thence the water is passed to a flocculator which may have a mechanical agitating device 22 therein. A level controller 23 may be operatively arranged with the flocculator and the inlet valve 16 in order to control the rate of introduction of water into the plant. From the flocculator the water is led through a conduit 24 having a valve 25 therein to the bottom of a settling basin 26. Preferably such basin contains a plurality of tubes inclined at a large acute angle, that is, between about 45° to 75° to the horizontal, there being a sufficient number of tubes that the flow rate through each is substantially laminar, thus permitting the flocculant and precipitable materials in the water to precipitate upon the bottoms of the tubes. Because of the tub tube inclination these solids will slide out of the tubes and fall to the bottom of the settling basin from whence they can be withdrawn periodically. The water flowing upwardly through the tops of the tubes is substantially clarified and is withdrawn through a flume 30 and carried to the top of a filter basin 32 having a bed of filter media 34 therein to effect removal of substantially all of the remaining foreign material in the water. After passing through the media 34, the clarified water is collected in an underdrain system 36, thence passed through a conduit 38 and valve 40 to a clearwell 42 from which it can be fed to the consuming system through a pump 44 and a conduit 46. In accordance with the present invention, the filter bed 34 is periodically backwashed by withdrawing water from the clearwell 42 and passing it through a conduit 50 containing a backwash pump 52 into the underdrain system 36. To effect backwash the valve 40 is closed and a valve 54 in the line 50 is opened. The backwash water flowing upwardly through the media 34 is carried into the flume 30 and thence back into the top of the settling basin 26. After the filter has been suitably backwashed, the valve 54 is closed and the settling basin and filter may be allowed to remain quiescent for a short period of time, if this is desired, to allow some of the heavier floc to settle below the tubes.

Periodically it will be necessary to draw sludge from the settling basin 26, a sludge drain-off conduit 56 being provided for this purpose, such conduit having a flow control valve 58 therein.

In addition to the backwash upwardly through the media 34, a surface wash system, including a surface washing header 60 may be provided over the filter. Water for the d surface backwash can also be withdrawn from the clearwell 42, a pump 62 and a conduit 64 being provided to pump water from the clearwell 42 to the header 60. A surface wash valve 66 is incorporated in the conduit 64.

Figure 4:
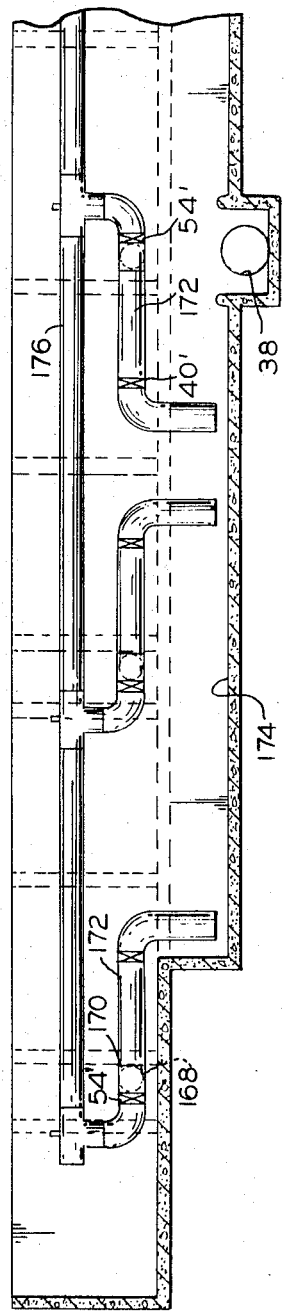
FIG. 4 is a section taken along line 4-4 of FIG. 2.
Figure 2:
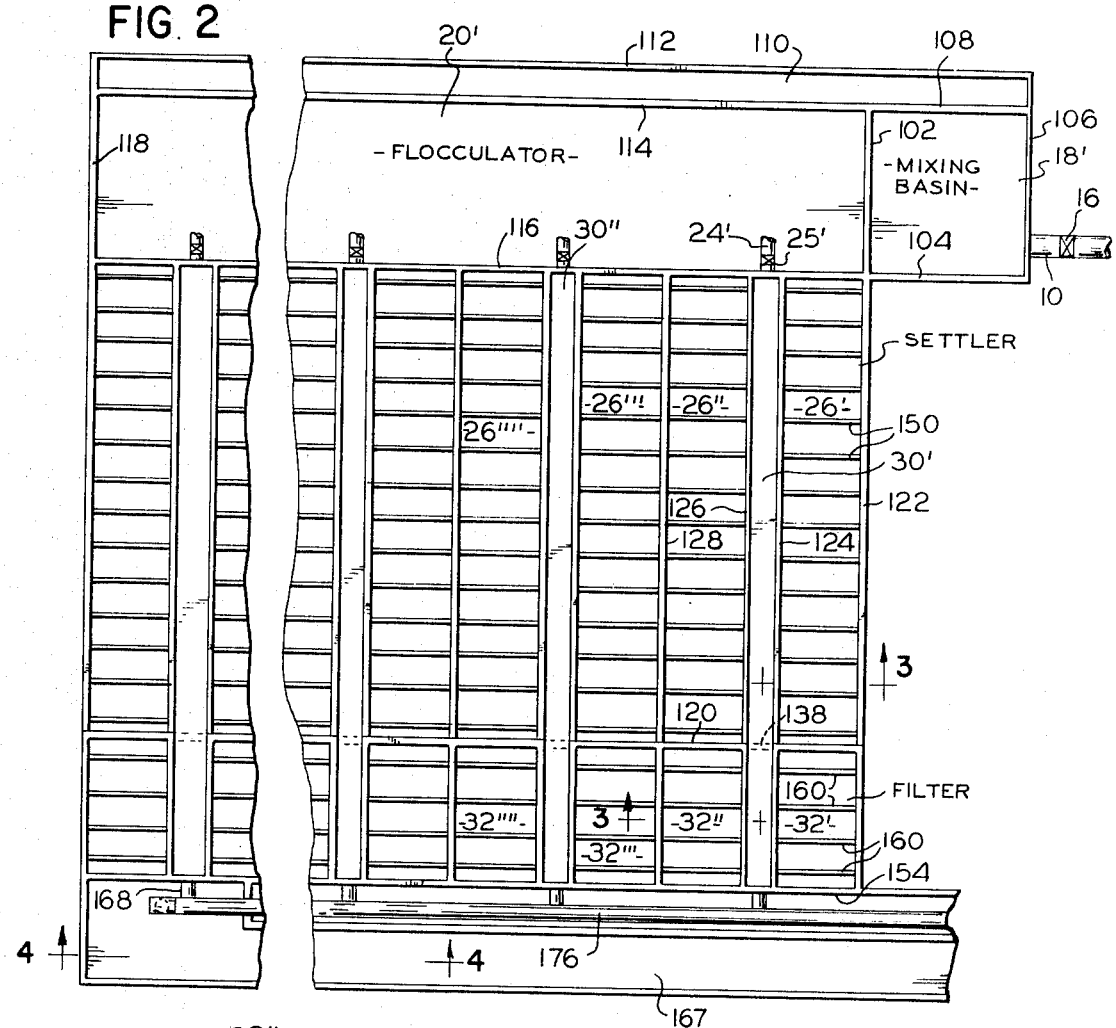
FIG. 2 is a plan view of a preferred configuration of a water treatment plant in accordance with the invention.
Figure 3:
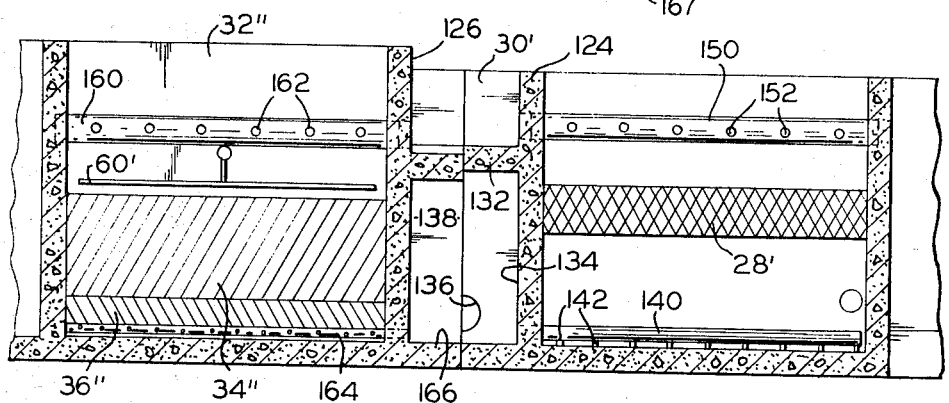
FIG. 3 is a section taken along line 3-3 of FIG. 2.

Reference is now made to FIGS. 2 to 4 inclusive which disclose a preferred configuration of a water treatment plan constructed in accordance with the invention. In such plant the mixing basin 18' has a common wall 102 with the flocculation basin 20', the mixing basin also being defined by walls 104, 106 and 108. Such walls, as well as the other walls of the system, may be formed of reinforced concrete or may be of other suitable construction. The wall 108 is of slightly lesser height than the other walls and serves as a weir over which water can flow into a distribution flume 110 defined by walls 112, 114, the wall 114 being a common wall with the flocculation basin 20'. The flocculation basin is also defined by walls 116, 118.

Extending at right angles from the flocculation basin 20' are a plurality of settling basins 26 arranged pairs on the opposite sides of collecting flumes 30. In FIG. 2 the right-hand most pair of basins is indicated by the numerals 26', 26" with the flume between them as 30', and the next pair of basins to the left being designated at 26''', 26'''' and the flume between them as 30", additional pairs of basins and flumes not being marked.

The settling basin 26' shares end wall 116 with the flocculator 20' and is otherwise defined by an opposite wall 120 and a pair of side walls 122, 124. The settling basin 26" is defined by end wall 116, sidewalls 126, 128 and end wall 130 opposite the wall 116. The walls 116, 120 are intermediate the ends of walls 122, 124, 126 and 128. Referring to FIG. 3, walls 124, 126 have a horizontal wall 132 extending between them and which defines the bottom wall for the flume 30. The wall 132 preferably slopes downwardly from the end wall 116 to induce flow away from such wall. The space beneath the wall 132 and between the walls 124, 126 defines a flume 134 for the influent from the flocculator 20', an inlet conduit 136 being provided to permit flow of water from the flocculator 20' into the flume 132 and a gate valve 137 being provided to control the flow of the water. In the same plane as the end wall 120 of the settling basins 26', 26", an end wall 138 is provided for the flume 134, such end wall being shown in dotted lines in FIG. 2. Means are provided to convey water from the flume 134 into the settling basins 26', 26" comprising laterals 140 communicating with the flume 134 and being provided with openings 142 to distribute the water across the width of the settling basin.

Suitably supported in each of the settling basins 26', 26" is a module 28' of setting settling tubes, that is, a plurality of tubes inclined at an angle of between about 45° to 70° and through which all of the water entering the bottom of a settling basin must pass. Such a module may be constructed as shown in Pat. application Ser. No. 721,150, filed Apr. 15, 1968. The tube modules are arranged so that the water flow rate therethrough will be substantially laminar whereby the settleable material will settle out within the tubes and slide thereon to the lower end of the tubes whereupon it can fall to the bottom of the settling basins. The water flowing upwardly will emerge from the tubes substantially clarified. The clarified water is collected in a plurality of collectors comprising tubes 150 extending between the walls 122, 124 and communicating with the flume 30, the tubes being provided with openings 152.

Arranged at the ends of the settling basin 26', 26'' opposite the flocculator 20' are filtering basins 32', 32'' respectively. The filter basin 32' is defined by the area between the walls 120, 122, 124 and an end wall 154 which extends parallel to the walls 114, 116 of the flocculator. The filter basin 32'' is defined by walls 126, 128, 120 and 154. A bed of filter media is provided withing each of the filtering basins 32', 32''. Preferably, such bed comprises a lower layer of rather relatively coarse gravel indicated in FIG. 3 at 36'', which serves as a supporting layer for the finer filter media 34'' above, and also as an underdrain for the filter media. The filtering media 34'' itself is of any suitable finely divided material, but preferably the media comprises materials of three different specific gravities so sized that upon backwashing he media will arrange itself to provide an increasing number of particles in the downward direction. Such an arrangement of filter media is more particularly described in U.S. Pat. No. 3,343,680.

Means are provided to distribute the effluent from the flume 30' over the filter media, such means comprising a plurality of distributing laterals 160 communicating with the flume 30' and being provided with openings 162. Similarly, a plurality of underdrain laterals 164 are provided in the lower part of the filter basin 32'' and which communicate with the flume 166 defined by the space between the walls 126, 124, 138 and 154.

Arranged forwardly of the wall 154 is a pipe gallery 167 containing the pipes for draining the clarified water from the filter effluent flume 166 and feeding backwash water thereto at the time of backwash. A typical piping arrangement is shown in FIGS. 2 and 4, and it will be seen that extending outwardly from each of the flumes 166 is a length of pipe 168 connected to a tee 170, one end of which is connected to a pipe 172 which discharges through a flow control valve 40' downwardly to a collecting flume 174. The other side of the tee 170 is connected to a backwash header 176 through a backwash cutoff valve 54'.

OPERATION

The operation will be described with reference to settling basins 26', 26'' and filters 32', 32''. The raw water to be clarified is fed to the mixing basin 18' from whence it is permitted to flow through the flume 110 to the flocculator 20'. The water will flow from the flocculator through inlet line 24' and valve 25' into the flume 134 and thence through the distributing tubes 140 into the settling basins 26', 26'' and upwardly through the tubes 28' therein, the clarified wa er being collected in the collectors 150 and passed into the adjacent flume 30'. Water will flow from the flume 30' through the headers 160 over the filter media 34'' in filters 32', 32'' and thence will trickle through such media to the supporting gravel to be collected by the laterals 164 and be conveyed therethrough into an effluent flume 166, finally passing out through the pipes 168, 172 into the flume 174 for final collection and passing to the clearwell.

When the filter media in the filters 32', 32'' reaches capacity and it is necessary to backwash the same, the gate valve 40' is closed and the valve 54' is then opened which permits backwash water to flow from the backwash header 176 through the pipe 168 into the filter effluent flume 166. This water will then be distributed by the laterals 164 and flow upwardly through the filter media washing out the material connected therein. Water can also be directed to surface washing header 60' by any conventional piping system (not shown). The wash water will be collected by the collectors 160 and conveyed into the flume 30' from whence it will be distributed by the collectors 150 over the settling tubes within the settling basins 26', 26''. After the filters have been washed for a suitable period of time, washing will be terminated, valve 54' closed, and the settling basins 26', 26'' permitted to remain quiescent for a period of time sufficient to permit the material over the tube modules to settle therein so that substantially clarified water will be drawn from the settling basins 26', 26'' when the system is reactivated. It would be possible immediately to start the recycle after backwash, but in such case too high a proportion of the material which was removed by backwashing would immediately be transferred back to the filters and would thus shorten the filtering time. As can be seen, the pairs of settling basins and filters can be operated alternately so that one or more units are in backwash while the others remain in operation to continue to pass clarified water to the receiving system.

Having illustrated and described certain preferred embodiments of the invention, it should be apparent to those skilled in the art that the invention permits of modification in arrangement and detail. We claim all such arrangements as come within the scope and purview of the appended claims.

We claim:

1. In a water treatment plant having a flocculator for causing the formation of a settleable floc in the water being treated:

a settling basin and a filtering basin;

conduit means extending between said basins for conveying water between said basins;

a settling device in said settling basin comprising a plurality of tubes inclined at a large acute angle to the horizontal;

means for introducing raw water from said flocculator to said settling basin beneath said settling device whereby said raw water is caused to flow upwardly through said tubes and settleable material carried by said water deposits in said deposits in said tubes;

a filter bed in said filtering basin;

said conduit means communicating with said filtering basin above said filter bed and with said settling basin above said settling device; and means communicating with said filtering basin beneath said filter bed for withdrawing water from said filter basin and alternatively for introducing backwash water for backwashing an said filter, whereby, upon backwash of said filter bed, the backwash water will flow through said conduit means to said settling basin.

2. Apparatus as set forth in claim 1 wherein said basins are in side-by-side relation and said conduit means comprises a trough extending between the upper portions of said basins.

3. A water treatment plant:

a flocculation basin having bottom, side and end walls;

a mixing basin for receiving raw water and having means therein for effecting mixing of water in such basin;

means for conveying water from said mixing basin to said flocculation basin;

a plurality of at least four vertical walls extending at right angles from a said sidewall of said flocculation basin and upwardly from a common bottom wall;

an end wall extending across the ends of said four walls remote from said flocculation basin;

an intermediate wall extending between a first and a second of said vertical walls at a point between said end wall and said flocculation basin sidewall, said intermediate wall, bottom wall, first and second walls and said flocculation basin sidewall defining a first settling basin, said intermediate wall, bottom wall, first and second walls and said end wall defining a first filter basin;

a second intermediate wall extending between a third and a fourth of said vertical walls, in the plane of the first mentioned intermediate wall, said second intermediate wall, bottom wall, the third and fourth walls and said flocculation basin side wall defining a second settling basin, said second intermediate wall, bottom wall, third and fourth walls and said end wall defining a second filter basin;

a horizontal wall extending between said second and third walls from said flocculation basin sidewalls to said end wall, said horizontal wall being spaced below the top of said second and third walls and above said bottom wall;

a vertical wall between said horizontal wall, bottom wall and second and third walls in the plane of said intermediate walls thereby defining below said horizontal wall a settler influent flume between said settling basin and a filter effluent flume between said filter basins, and defining above said horizontal wall a settler settler-filter flume;

a settling device in each of said settling basins comprising a plurality of tubes inclined at a large acute angle to the horizontal arranged in said basins so that all water flowing upwardly in a basin must pass through said device;

a filter bed in each of said filtering basins;

conduit means including a valve for admitting water from said flocculation basin to said see settler influent flume;

means to convey water from said settler influent flume to the bottom portion of each of said settling basins;

means to convey water from the top portion of each of said settling basins to said settler influent flume;

means to convey water from said settler-filter flume to the top of each of said filtering basins;

means to convey water from the bottom of each of said filter basins to said filter effluent flume;

conduit means including a valve for conducting water out of said filter effluent flume; and conduit means including a valve for conducting backwash water into said filter effluent flume, whereby upon admission of said backwash water the same will flow from said filter basins through said settler-filter flume into said settling basins.

UNITED STATES PATENT OFFICE
CERTIFICATE OF CORRECTION

Patent No. __3,545,619__     Dated __December 8, 1970__

Inventor(s) __William F. Ettlich and Andrew Kou-Ying Hsiung__

It is certified that error appears in the above-identified patent and that said Letters Patent are hereby corrected as shown below:

Col. 1, line 69, remove "tub" between "the" and "tube"

Col. 2, line 25, remove "d" between "the" and "surface"

Col. 2, line 31, change "plan" to --plant--

Col. 2, line 44, insert --in-- between "arranged" and "pair"

Col. 2, line 75, remove "setting" between "of" and "settling"

Col. 3, line 21, change "withing" to --within--

Col. 4, line 42, remove "in said deposits" between "deposit" and "in said tubes"

Col. 4, line 50, remove "an" between "backwashing" and "said"

Col. 5, line 17, remove "settler" between "a" and "settler-filter"

Col. 6, line 4, remove "see" between "said" and "settler"

Signed and sealed this 9th day of March 1971.

(SEAL)
Attest:

Edward M. Fletcher, Jr.
Attesting Officer

WILLIAM E. SCHUYLER, Jr.
Commissioner of Patent